Sept. 16, 1969

E. M. GALLE 3,467,448

DRILL BIT BEARING SEAL ASSEMBLY INCLUDING
RESILIENTLY MOUNTED RIGID RING

Filed Nov. 24, 1965

INVENTOR
*Edward M. Galle*
BY
*Wofford & Felsman*
ATTORNEY

United States Patent Office 3,467,448
Patented Sept. 16, 1969

3,467,448
DRILL BIT BEARING SEAL ASSEMBLY INCLUDING RESILIENTLY MOUNTED RIGID RING
Edward M. Galle, Houston, Tex., assignor to Hughes Tool Company, Houston, Tex.
Filed Nov. 24, 1965, Ser. No. 509,480
Int. Cl. F16c 19/00, 29/00; E21b 9/08
U.S. Cl. 308—8.2                                    12 Claims

ABSTRACT OF THE DISCLOSURE

A seal means that has an annular body with a rigid and circumferentially continuous portion supported upon a resilient core which is sealingly fixed to a bearing element directly or through a retainer ring. The rigid portion engages and compresses a resilient packing ring against an opposed surface to effect a fluid seal.

---

In a copending application, Ser. No. 506,654, filed Nov. 8, 1965, now Patent No. 3,397,928, I disclosed improvements in seal means of the type that utilize resilient packing rings, and these improvements effectively seal lubricant inside a drill bit bearing and exclude foreign materials therefrom. Another effective seal means for drill bit bearings was patented by Atkinson, et al., U.S. Patent No. 3,075,781.

My present invention is directed to another effective means for sealing lubricant inside (and in excluding foreign materials from) drill bit bearings, such means having certain advantages over other types of seal means, as will become apparent hereinafter.

One probem encountered when trying to originate satisfactory seal means for drill bit bearings arises from the nature and extent of cone movement relative to the bearing shaft. Cone movement is complex and includes rapid axial and radial motions as well as wobbing motions. Such motions generate presure variations in the lubricant that are sensed by the seal means. Moreover, the sensed pressure variations often result in lubricant losses, as sometimes happens when using the seal means of Atkinson et al.

My above mentioned copending application and patent discloses seal means in which resilient packing ring type seals (which are highly effective in the presence of pressure variations and of which the O-ring and the quad rink are popular forms) may be successfully utilized in drill bit bearings. The solution disclosed in my copending application to the problem of sealing drill bit bearings produces relatively large unit loadings on the resilient packing rings, which nevertheless perform satisfactory. However, in drill bits wherein the bearing wear and cone movements may be expected to be extreme, the seal means of my present invention will operate satisfactorily even after such great wear and without inducing high unit loadings on the packing rings.

Accordingly, it is the general object of my invention to provide improved seal means for drill bit bearings.

Another object of my invention is to provide apparatus for use in drill bit bearings that utilize resilient seal rings, said apparatus providing an effective seal even though cone movement or wear of the bearing surfaces is relatively large.

Another object of my invention is to provide apparatus in drill bit bearings which reduces the unit loading on resilient seal rings and the adjacent engaging surfaces.

These and other objects are effected by my invention as will be apparent from the following description, taken in accordance with the accompanying drawing, in which.

Figure 1:
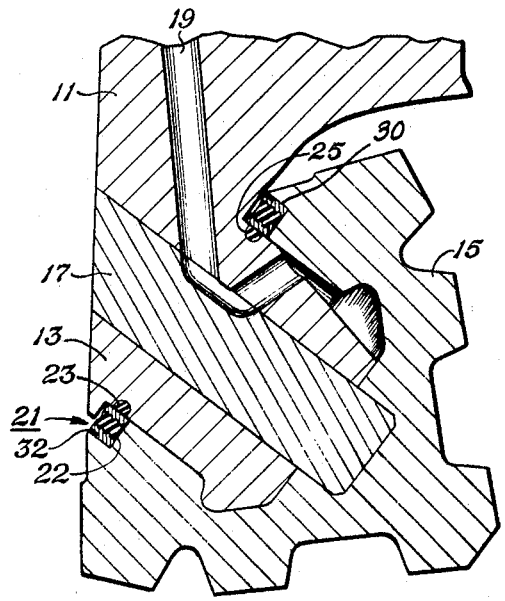
FIG. 1 is a side elevational view in fragmentary section of the lower region of a drill bit, including the drill bit bearing shaft or pin, the associated rotatable cutter element or cone, and seal means having a resiliently mounted, rigid and circumferentially continuous portion assembled therewith in accordance with the principles of my invention.

The numeral 11 in the drawing designates the lower region of a drill bit body that includes a bearing shaft 13. Rotatably secured to the bearing shaft 13 is a cutter element or cone 15 which is retained on the bearing shaft 13 with the assistance of a retainer pin 17. Bearing shaft 13 and cutter 15 have suitable bearing surfaces formed thereon, and a passageway 19 connect these bearing surfaces with a reservoir and grease feeding device (not shown) that is located in an upper region of the rill bit. Preferably, the grease feeding device is of the type which substantially equalizes the pressure of the lubricant and the drilling fluid in the bore hole.

An annular body 21 is inserted in an annular (here L-shaped) groove 22 in the cutter 15. Also, a resilient seal or packing ring 23 (here an O-ring, as contrasted with a quad ring or other cross sectional shape) is positioned within an annular groove 25 in bearing shaft 13. As may be seen in FIG. 2, the annular body 21 in this instance is composed of a retainer ring 27, a resiliently mounted, rigid and circumferentially continuous portion or ring 31, and a resilient core 29 bonded therebetween. The mutually opposed cylindrical surfaces of retainer ring 27 and floating ring 31 may be grooved, as indicated by the numeral 33, to increase the area of the bonded surfaces.

Figure 2:
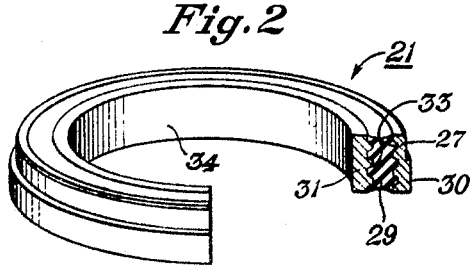
FIG. 2 is a perspective view of an annular body (also shown in FIG. 1) which includes a resiliently mounted, rigid and circumferentially continuous portion having a section removed to expose the construction thereof.

For the purpose of sealing fixing or securing the annular body 21 within the annular L-shaped groove 22 of cutter 15, the outer cylindrical surface 30 (see FIG. 1) of retainer ring 27 has a larger diameter than does the mating cylindrical surface of groove 22. Upon forcing the retainer ring into groove 22, an interference fit is obtained. The cylindrical surface 30 of the retainer ring need not necessarily extend across the entire axial thickness of the retainer ring (as is illustrated in FIGS. 1 and 2). If not, then the cutter metal around the resulting annular gap 32 may be deformed into the gap to further help retain the annular body 21. Also, retainer means other than interference fits are within the scope of my invention.

Packing ring 23 (here an O-ring) extends radially outward beyond its confining groove 25 in bearing shaft 13. As a consequence, the packing ring engages and is compressed against inner cylindrical surface 34 of the rigid and circumferentially continuous ring 31, thus sealing an interior region between the opposing bearing surfaces of the shaft 13 and cutter 15. Smaller ranges of packing ring interferences may be successfully utilized with the above apparatus in drill bit bearings, as contrasted with the interferences described in my above mentioned copending application and patent with certain advantageous results.

Drill bits having seal means of the type illustrated in FIGURES 1 and 2 have been tested using dimensions and tolerances such that the resilient packing rings 23 were compressed by seven through fourteen percent of their relaxed cross sectional thickness.

An example of manufacturing data for successfully used seal means of the type shown in FIGS. 1 and 2 is follows:

A resilient packing ring 23 constructed of butadiene acrylonitrile (Buna N) rubber with an inside diameter of 1.984±.010 inches and a .139±.004 inch cross sectional thickness was inserted in an annular groove formed on a bearing shaft having a diameter of 2.250 +0 —.002 inches in the region of the seal. The diameter of the bottom of the annular groove was 2.007 +.002 —0 inches, and the groove 25 width was .150 +.004 —0 inches, with the corners in the bottom of the groove having radii of .062 +0 —.010 inches.

The inside diameter of the bearing surface in the cutter in the region of the seal was 2.255 +.002 —0 inches. The L-shaped groove 22 has a diameter of 2.877 +0 —.001 inches and was .281 inches deep from the backface of the cutter. Annular body 21 had an inner diameter of 2.255 +.002 —0 inches, and an outside diameter of 2.881 +.0005 —0 inches, with retainer ring 27 and rigid and circumferentially continuous ring 31 having axial thicknesses of respectively .281 +.005 —0, and .266 +.005 —0, and an overall radial thickness of .110. The resilient core was manufactured of butadiene acrylonitrile rubber of 50 (Shore A) hardness, being suitably bonded between the retainer and floating rings, which were made from 4137 H steel that was heat treated prior to machining to 341–363 BHN. The inside diameter of rigid and circumferentially continuous ring 31 was hard chrome plated to increase wear resistance. Drill bits having seal means of this type were tested in the field and in the laboratory and performed satisfactorily over the entire life span of the drill bit.

Figure 6:
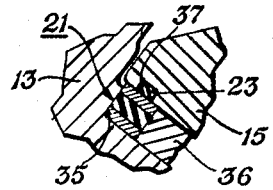
FIG. 6 is another fragmentary side elevational view in section of a drill bit bearing shaft and cutter assembled with still another modified form of my seal means.

FIG. 6 illustrates an embodiment of my invention in which the annular body 21 is inserted in an annular groove 35 of the bearing shaft 13, instead of being assembled in a groove in the rotatable cutter 15 as in FIG. 1. Bearing shaft 13 has a sleeve 36 that is secured to the remainder of the bearing shaft after the annular body 21 is inserted on the shaft. In this instance, an annular groove 37 is formed in the opposing bearing surface in the rotatable cutter 15 and a packing ring 23 is assembled therein. Having a large groove 35 in the bearing shaft would increase the stresses therein, but nonetheless, this would be within the scope of my invention.

Figure 3:
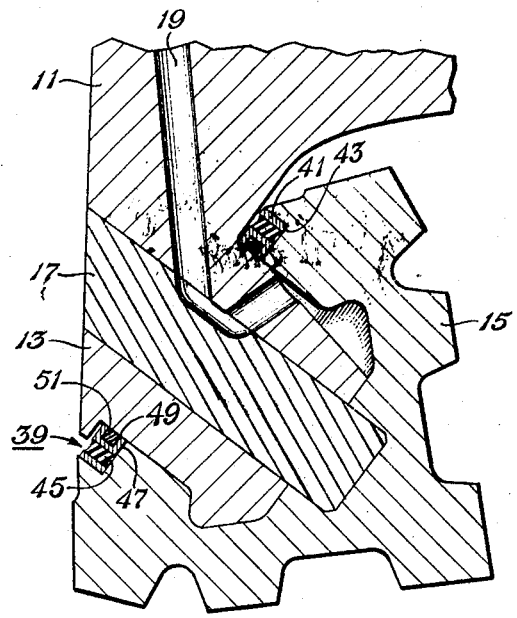
FIG. 3 is a fragmentary side elevational view in section of a drill bit similar to the one shown in FIG. 1, with a modified form of my seal means assembled therewith.

Illustrated in FIG. 3 is an annular body 39 which has a retainer ring 41 secured by interference fit within an annular groove 43 in rotatable cutter 15, and which includes a resilient core 45. As may be better seen in FIG. 4, bonded to the resilient core 45 is a rigid and circumferentially continuous ring 47 that has an annular groove 49 formed in the inner cylindrical surface thereof. A packing ring 51 is inserted within the groove 49 and is urged against the shaft 13. This type of annular body can be with modifications, secured within an annular groove of the type shown in connection with FIG. 6, although it is advisable to keep annular grooves out of the bearing shaft where possible. One advantage of the embodiment shown in FIG. 3 is the elimination of the necessity for having any type of groove in the bearing shaft.

Figure 4:
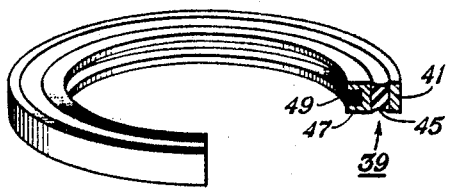
FIG. 4 is a perspective view of an annular body (also shown in FIG. 3) which includes a resiliently mounted rigid and circumferentially continuous ring and which has a section removed to expose its construction.

An example of manufacturing data for successfully used seal means of the type shown in FIGS. 3 and 4 is as follows:

The diameters of the bearing surfaces of the cutter 15 and shaft 13 in the region of the seal means were identical with those of the drill bit shown in FIG. 1. However, groove 43 of the cutter 15 was 3.0665 +0 —.0005 inches in diameter, with the inside diameter of rigid and circumferentially continuous ring 47 being 2.255 +.002 —0. The bottom of the O-ring groove 51 had a diameter of 2.500±.001, a width of .145 + .005 —0 with radii in the corners of .015 +0 —.010. The outside diameter of the retaining ring 41 was 3.0675 +.0005 —0, with the retaining ring 41 and rigid and circumferentially continuous ring 47 having radial thicknesses of respectively .0685 and .188, and an axial thickness of .281 +.005 —0. The annular body 39 and packing ring 51 had material specifications like those given in describing the annular body of FIGS. 1 and 2. The packing ring 51 was of the O-ring type, having an inside diameter of 2.359±.010 inches and a cross sectional thickness of .139±.004.

Figure 5:
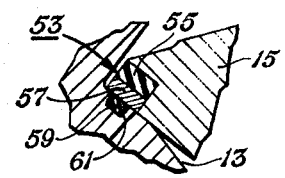
FIG. 5 is a fragmentary side elevational view in section of a drill bit bearing shaft and cutter assembled with a modified form of my seal means.

There are a number of configurations and types of materials which may be utilized in the manufacture of a suitable annular body. In FIG. 5 is illustrated an annular body 53 which has a resilient core 55 bonded directly to the cutter 15. The rigid and circumferentially continuous ring 57 is bonded to the resilient core 55 and engages the packing ring 59 assembled within a suitable groove 61. This construction eliminates the retaining rings shown in the other embodiments. An annular body of the general type shown in FIG. 5 may be modified such that the resilient core 55 is bonded to the shaft 13. If so, the relative positions of the resilient core 55 and the rigid and circumferentially continuous ring 57 must be reversed, and the packing ring 59 positioned in an annular groove in the cutter, or in an annular groove formed in the outer cylindrical surface of the rigid and circumferentially continuous element. In the FIG. 5 embodiment, the packing ring may be assembled within a groove formed in the rigid and circumferentially continuous element 57. similar to the groove shown in FIG. 3.

It should be apparent from the foregoing that I have provided an invention having significant advantages. The annular bodies described above each have a rigid and circumferentially continuous ring which engages a packing ring to form an effective seal means. The resilient core of the annular body tends to keep the rigid and circumferentially continuous ring or element centrally located with respect to the opposing surface on the shaft or cone. Irrespective of the load imposed on the drill bit cutter and the bearing shaft 13, the unit loading exerted on the packing ring and the adjacent engaging surfaces by the rigid and circumferentially continuous ring can be established at a low value. This reduces the stresses in the packing ring and the adjacent engaging surfaces and lessens wear and reduces danger of failure. Greater cone movement can be tolerated since the rigid and circumferentially continuous element is centralized and will tend to stay that way irrespective of the cone movement. In addition, wear of the bearing surfaces of the cone and the bearing shaft has less detrimental effect on the sealing means since the rigid and circumfernetially continuous element still tends to be centralized.

My invention may be utilized with packing rings having various geometries, and can be used in combination with seal rings other than those of the packing ring type. Reduced unit loading on the seal ring and the other advantages explained above could be beneficial to essentially any form of seal ring.

While I have shown my invention in only a few of its forms, it should be apparent to those skilled in the art that it is not so limited but is susceptible of various changes and modifications without departing from the spirit thereof.

I claim:

1. In combination with a drill bit having a seal ring positioned to seal a region of the clearance between opposing bearing surfaces on a shaft and in a rotatable cutter, an annular body sealingly fixed to a selected one of said shaft and said rotatable cutter, said body having a rigid and circumferentially continuous portion that sealingly engages and compresses said seal ring, and a resilient core that supports said rigid portion.

2. The invention as defined by claim 1 wherein said seal ring is positioned within an annular groove in said shaft, and wherein said annular body is secured within an annular groove in said rotatable cutter.

3. The invention as defined by claim 1 wherein said seal ring is positioned within a groove in said cutter and wherein said annular body is secured to said shaft.

4. In combination with a drill bit having a seal ring positioned to seal a region of the clearance between opposing bearing surfaces on a shaft and in a rotatable cutter, a retainer ring sealingly fixed to a selected one of said shaft and said rotatable cutter, a resilient core secured to said retainer ring, and a rigid and circumferentially continuous ring secured to said resilient core to engage and compress said seal ring.

5. The invention as defined by claim 4 wherein said seal ring is positioned within an annular groove in said shaft, and wherein said retainer ring is secured within an annular groove in said rotatable cutter.

6. The invention as defined by claim 4 wherein said seal ring is positioned within a groove in said cutter and wherein said retainer ring is secured to said shaft.

7. In combination with a drill bit having a seal ring positioned to seal a region of the clearance between opposing bearing surfaces on a shaft and in a rotatable cutter, an annular body sealingly fixed to a selected one of said shaft and said rotatable cutter, said body having a rigid and circumferentially continuous portion which includes an annular groove that receives the seal ring, and a resilient core that supports and is fixed to said rigid portion; said seal ring being urged against the other one of said shaft and said rotatable cutter.

8. The invention as defined by claim 7 wherein said annular body is secured within an annular groove in said cutter.

9. The invention as defined by claim 7 wherein the annular body is secured to said shaft.

10. In combination with a drill bit having a seal ring positioned to seal a region of the clearance between opposing bearing surfaces on a shaft and in a rotatable cutter, a retainer ring sealingly fixed to a selected one of said shaft and said rotatable cutter; a resilient core secured to said retainer ring; and a rigid and circumferentially continuous ring secured to and suspended by said resilient core and having an annular groove that receives the seal ring, which is urged against the other one of said shaft and said rotatable cutter.

11. The invention as defined by claim 10 wherein said retainer ring is secured within an annular groove in said cutter.

12. The invention as defined by claim 10 wherein said retainer ring is secured to said shaft.

References Cited

UNITED STATES PATENTS

| | | | |
|---|---|---|---|
| 901,866 | 10/1908 | Atkinson. | |
| 2,362,363 | 11/1944 | Doede | 277—82 |
| 2,622,905 | 12/1952 | Heinrigh | 277—95 |
| 2,654,325 | 10/1953 | Minshall | 277—81 |
| 2,742,306 | 4/1956 | Kelso | 277—174 |
| 3,001,385 | 9/1961 | Allen. | |
| 3,116,931 | 1/1964 | Edwards | 277—165 |
| 3,244,457 | 4/1966 | Ross | 308—361 |
| 3,303,898 | 2/1967 | BerCaru | 308—8.2 |

FOREIGN PATENTS 1,260,080  12/1961  France.

MARTIN P. SCHWADRON, Primary Examiner

L. L. JOHNSON, Assistant Examiner

U.S. Cl. X.R.

175—372; 277—81, 84, 92, 165; 308—36.1, 187.1